May 21, 1963  R. A. BENNETT ETAL  3,090,360
HYDRAULIC ACTUATOR
Filed Sept. 8, 1961  7 Sheets-Sheet 1

INVENTORS.
*Richard A. Bennett*
BY *& Harold O. Kron,*
*Paul & Paul*
ATTORNEYS.

May 21, 1963    R. A. BENNETT ETAL    3,090,360
HYDRAULIC ACTUATOR
Filed Sept. 8, 1961    7 Sheets-Sheet 4

INVENTORS:
Richard A. Bennett
BY  & Harold O. Kron,

Paul & Paul
ATTORNEYS.

FIG. 8

United States Patent Office 3,090,360
Patented May 21, 1963

3,090,360
HYDRAULIC ACTUATOR
Richard A. Bennett, Glenside, and Harold O. Kron, Philadelphia, Pa., assignors to King of Prussia Research & Development Corporation, King of Prussia, Pa., a corporation of Pennsylvania
Filed Sept. 8, 1961, Ser. No. 136,810
19 Claims. (Cl. 121—38)

This invention relates to a hydraulic actuator for a shaft or stem.

The principal object of the present invention is to provide a hydraulic actuator which in response to fluid pressure applies axial thrust to a shaft to move the shaft in its lengthwise direction, without turning the shaft rotationally.

Another object is to provide a hydraulic actuator as described above which is adapted to move a shaft of either relatively short length or of very great length.

Another object is to provide a fluid actuator as described above which has the capability of moving the shaft in either of its two axial directions, as selected.

The means by which the foregoing and other objects of the present invention are accomplished will be clear from a consideration of the following detailed description of several preferred embodiments selected for illustration in the drawing, in which.

In describing the preferred embodiments of the invention illustrated in the drawing, specific terminology has been resorted to for the sake of clarity. However, it is not our intention to be limited to the specific terms so selected, and it is to be understood that each specific term includes all technical equivalents which operate in a similar manner to accomplish a similar purpose.

Figure 1:
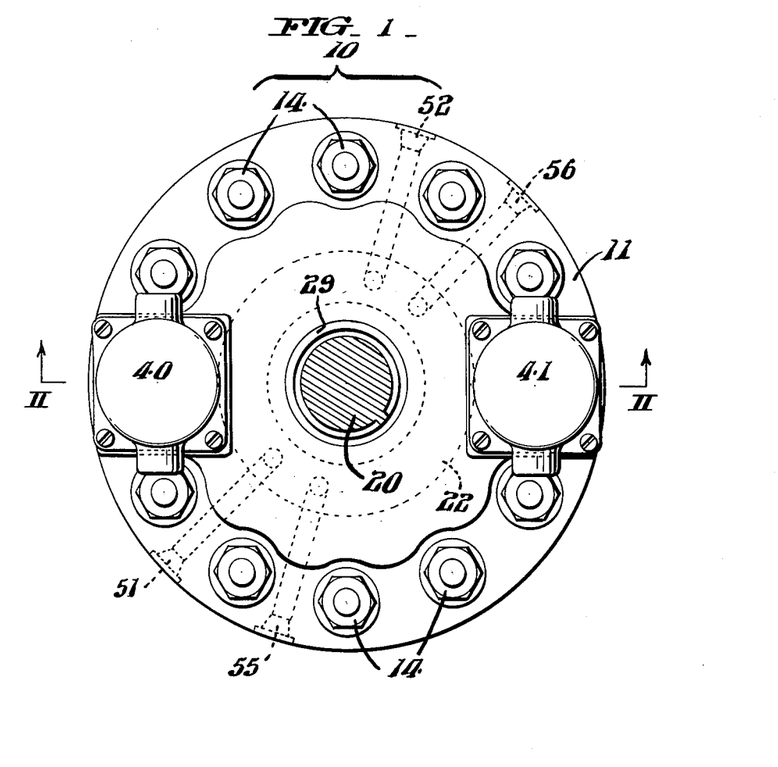
FIG. 1 is a top plan view of a hydraulic actuator embodying the present invention in one preferred form.
Figure 2:
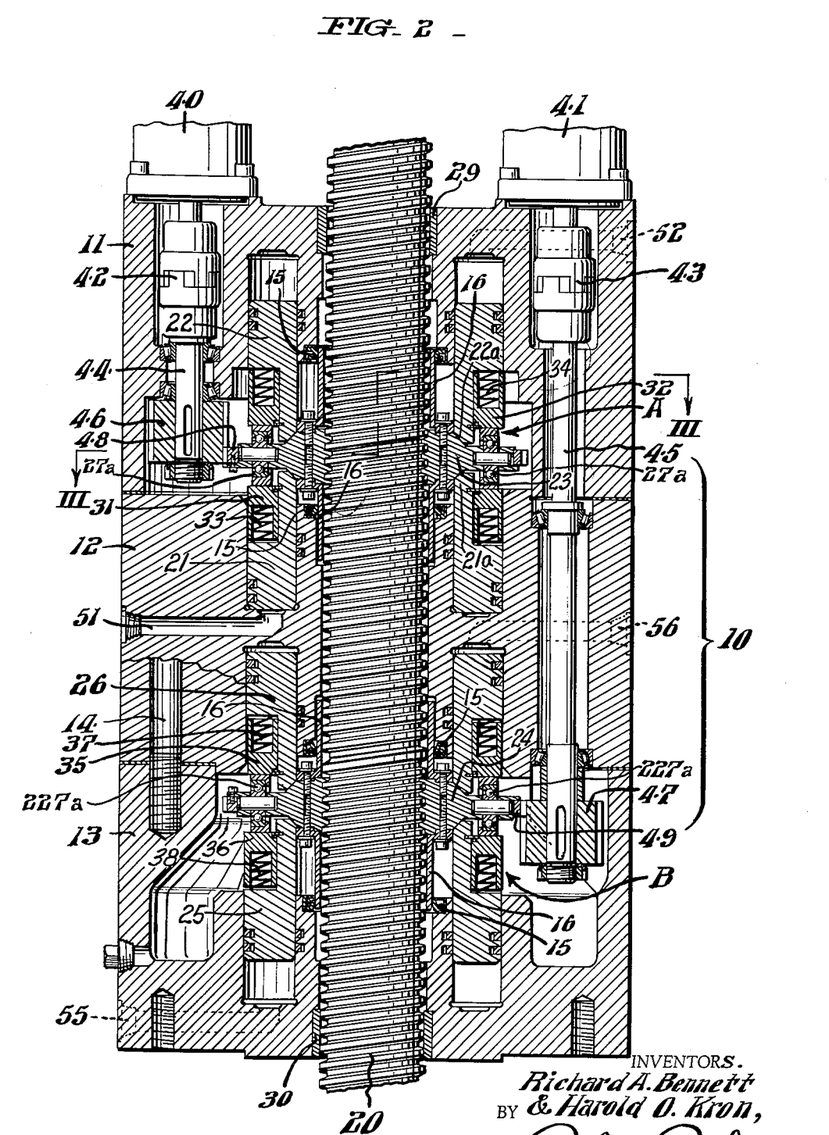
FIG. 2 is an elevational view in section along the line II—II of FIG. 1 looking in the direction of the arrows.
Figure 3:
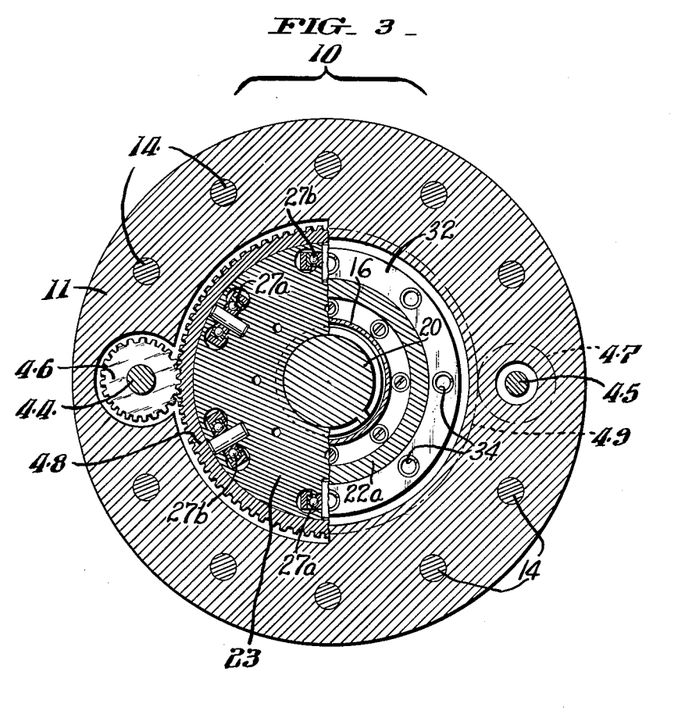
FIG. 3 is a plan view in staggered section along the line III—III of FIG. 2 looking in the direction of the arrows.

Referring now to FIG. 2, of the drawing, the fluid actuator of the present invention is illustrated as comprising a three-section annular housing 10 having an upper section 11, a central section 12 and a lower section 13. The three sections of the housing 10 are shown to be secured together by a plurality of studs 14 as seen in FIGS. 1 and 3, a portion of one stud being also visible in FIG. 2.

Extending completely through the annular housing 10 and protruding from either end thereof is a threaded shaft or stem 20. This is the shaft or stem which the hydraulic actuator of the present invention is adapted to move in either of its lengthwise directions, without turning the shaft rotationally. So far as the capability of the hydraulic actuator of the present invention to move the shaft 20 is concerned, the shaft may be of almost any length.

The ability of the hydraulic actuator of the present invention to drive extremely long shafts or stems is one of its advantages. The housing 10 of the hydraulic actuator remains fixed, being secured to a support or base (not shown) by suitable bolts inserted into bolt holes 19. The shaft or stem 20 passes completely through the actuator housing, and the thrust of the actuator is applied to the shaft in an axial direction in short alternating strokes. The actuator is concerned only with that portion of the stem which is within the housing at that time, and the total overall length of the stem being of little or no consequence.

The hydraulic actuator of the present invention does not require that the shaft or stem 20 be keyed, as is true of some prior-art actuators of which we have knowledge. Since the provision of an accurate key or keyway in a long shaft is difficult to achieve, the lack of need of a key or keyway in shaft 20 is a further advantage of the hydraulic actuator of the present invention.

The shaft or stem 20 may be moved in either axial direction by the actuator unit illustrated in FIG. 2 of the drawing. For convenience, we will refer to these two directions as up or down, up being toward the top of the drawing, and down being toward the bottom. It should be understood, however, that the stem 20 need not be operated in a vertical position, and that it may just as easily be moved by the hydraulic actuator in either of two directions while in a horizontal or any other position.

Movement of the stem 20 in its axial or lengthwise direction is accomplished by means of fluid-actuable pistons 21 and 25 or 22 and 26, according to the direction of movement desired, the pistons 21 and 25 being employed for driving the stem 20 upward, the other two pistons 22 and 26 being employed for driving the stem 20 downward. The pistons which are not employed in applying thrust to the stem 20 in the selected direction do, however, play a part in the operation of the actuator, since the non-thrusting or non-driving pistons are employed for returning the thrust or drive pistons to their starting positions.

As will be seen from FIG. 2, while the hydraulic actuator housing consists of three sections, 11, 12 and 13, the actuator mechanism itself consists of two similar units which for convenience will be referred to as an upper unit A and a lower unit B. Upper unit A includes, among other things, the two annular pistons 21 and 22, a nut 23, and vane-type fluid motor 40. Lower unit B includes the annular pistons 25 and 26, a nut 24, and a vane-type fluid motor 41.

The stem 20 is driven upward by the axial thrust of the annular pistons 21 and 25 of the upper and lower units respectively, acting alternately on nuts 23 and 24, of the upper and lower units. No rotational motion of either the stem 20 or of the nuts 23, 24 is involved in the drive or thrust stroke. During the return stroke of each piston, the nut 23 or 24 associated therewith is rotated, as will be described, but the stem 20 is not rotated at all during any part of the actuation cycle.

The driving pistons, 21 and 25 in the present example, are driven alternately by relatively high fluid pressure applied alternately to ports 51 and 55. Such high pressure may, for example, be of the order of 3,000 to 4,000 p.s.i. Preferably, a short interval of time before the high pressure is removed from one piston, it is applied to the other, so that a brief overlap period exists during which both pistons are being driven by high pressure. Except for this brief overlap, one of the pistons 21 and 25 is on its return stroke when the other is on its thrust stroke.

Return of each of the pistons 21 and 25 to its starting position at the termination of its thrust stroke, is effected (when the stem 20 is being driven upward as in the present discussion) by the pistons 22 and 26, respectively, each of which is driven downward at alternate times in the cycle by a relatively low fluid pressure applied to ports 52 and 56 under the control of circuit means to be described later.

In addition to returning each of the drive pistons to its starting position after each thrust stroke, assumed to be upward in the present discussion, it is necessary to return each of two nuts 23 and 24 to its starting position at about the same time that the drive piston associated therewith is being returned to its starting position. Return of each of the nuts 23 and 24 is effected by means of a vane-type fluid motor 40 and 41, respectively, a separate motor being provided for each nut.

As will be seen from FIG. 2, vane motor 40 is coupled to nut 23 through coupling 42, pinion shaft 44, nut-return pinion 46 and an annular nut-return gear 48 which is secured to nut 23 as by a plurality of screws. In similar fashion, the other vane motor 41 is coupled to nut 24 through coupling 43, pinion shaft 45, nut-return pinion 47 and nut-return gear 49.

Nut-return pinions 46 and 47 are always in engagement with the nut-return gears 48 and 49, respectively. However, during the drive or thrust stroke of a piston, the nut associated with that piston resists being driven rotationally. During such periods, the vane motor merely stalls, motors 40 and 41 being of a type which can be stalled under load without damage to the motor.

The remaining structural details of the hydraulic actuator illustrated in FIGS. 1–3 of the drawing will become clear during the following description of the operation of the device.

Assume that the stem 20 is to be driven upward and that the pistons are in the positions shown in FIG. 2. As there shown, lower-unit piston 25 is within a short distance (for example, 1/8") of completing its upward thrust stroke. Upper-unit piston 21 has completed its downward stroke returning and is ready for its upward thrust stroke. High fluid pressure (for example, 3,000–4,000 p.s.i.) is now applied, under the control of a system to be described, to port 51 to drive piston 21 upward.

As seen in FIGS. 2 and 3, each of the nuts 23 and 24 of the upper and lower units is equipped with bearings 27a, 27b and 227a, 227b, respectively, at radially spaced locations. Alternate bearings of the same nut, such as 27a, are pinned to the nut at a slightly higher level (for example, 1/16" higher), than the other alternate bearings, such as 27b. Thus, while each of the bearings is always in contact with both of the opposed spring-loaded thrust plates, i.e., both above and below the bearing, one of the opposing thrust plates 31, 32 (or 35, 36) is in but light frictional engagement with the bearing thereby permitting the bearing to rotate about its pin when the nut is rotated on stem 20 during the return stroke, as will be described.

When piston 21 is driven upward, the helical springs 33 (there are a plurality of spaced-apart springs 33 within the annular thrust plate 31) are further compressed. This allows the upward extending flange 21a of the piston 21 to contact the nut 23 and to drive the nut 23 upward, carrying with it the stem 20 to which it is threadedly secured. When piston 21 is thus driven upward, the helical springs 34 of the opposing spring-loaded annular thrust plate 32 are further compressed, allowing the nut 23 to come into contact with the depending flange 22a of the piston 22.

Compression of springs 34 occurs, when piston 21 drives nut 23 upward, because of an opposing pressure which exists in the cylinder of piston 22 due to the port 52 being connected back to the fluid reservoir through flow control valve 60 (FIG. 4) the orifice of which has been set to provide a constant rate of fluid flow when the applied pressure is, for example, 500 p.s.i. or more. The force of this pressure of 500 p.s.i. or more on the base of piston 22 is greater than the compressive force of the helical springs 34 and, thus the springs 34 are compressed.

It will be seen then that during the main portion of the thrust stroke of piston 21 the flanges 21a and 22a of the pistons 21 and 22 are in tight frictional contact with nut 23. These frictional contacts offer sufficient resistance to prevent nut 23 from rotating on stem 20 despite the fact that the vane motor 40 is trying to rotate nut 23 through nut-return pinion 46 and nut-return gear 48. The nut 23 being thus prevented from rotating, the vane motor 40 merely stalls under the load.

As a result then of the high fluid pressure applied to port 51, piston 21 is driven upward, and in so doing moves nut 23 upward through a distance equal to the length of the stroke of piston 21 which may, for example, be of the order of 1½". Support of stem 20 for such lengthwise movement is provided at the upper end of housing 10 by a guide bushing 29 and at the lower end of housing 10 by a guide bushing 30. Reference numerals 15 and 16 represent, respectively, oil seals and seal sleeves for preventing the lubricating oil from escaping and running down the threaded stem 20.

During the upward stroke of piston 21, just described, the piston 25 of the lower unit B is moved through its return stroke. The means by which the return of piston 25 is accomplished is substantially identical to that by which piston 21 is returned, as will now be be described.

When the piston 21 reaches the end of its thrust stroke, the control system, later to be discribed in detail, disconnects the supply of high fluid pressure to port 51, connects port 51 to vent, and connects port 52 to a source of low fluid pressure, as for example 10 to 50 p.s.i. The removal of the high pressure from piston 21 removes the high force from the springs of the thrust plates 31 and 32, and the compression springs 33 and 34 expand, thereby moving the piston 21 slightly downward and the piston 22 slightly upward sufficient to clear the nut 23, thus releasing the nut 23 for rotation by the nut-return pinion 46 driven by the previously stalled vane motor 40.

The low fluid pressure (10 to 50 p.s.i.) which is now applied to port 52 moves the piston 22 downward but the force established by this low pressure is insufficient to compress either of the groups of compression springs 34 or 33. Thus, the pistons 22 and 21 remain clear of nut 23, and the nut is driven rotationally by vane motor 40 in direction to return the nut downward. At the same time, the low fluid pressure applied to port 52 and to the base of piston 22 forces the thrust plate 32 downward against the thrust bearing 27. This force is transmitted to thrust plate 31 and to piston 21 causing the piston 21 to move downward, and causing the fluid to exit from port 51. In this manner, piston 21 is returned to its starting position. This completes the description of the action taking place in the upper unit A.

Action similar to that just described also takes place in the lower unit B, but the action in the lower unit is 180° out of phase with that of the upper unit.

With respect now to the pressures at the various ports 51, 52, 55 and 56, except for the brief interval immediately preceding the end of the thrust stroke during which high fluid pressure is applied to both ports 51 and 55, the lower-unit port 55 is fully vented when high pressure is applied to the upper-unit port 51, and vice versa. When port 51 of the upper unit A is connected to high fluid pressure, port 52 of the upper unit is vented through a restrictive flow-control valve effective to set up an opposing or back pressure of at least 500 p.s.i. During this portion of the cycle, port 56 of the lower unit B is connected to a source of low fluid pressure, and port 55 is venting through an unrestricted connection to the fluid reservoir.

The means by which stem 20 is moved upward is by now clearly understood. It will be seen that first one and then the other of the two pistons 21 and 25 of the upper and lower units A and B, respectively, drive the stem 20 upward in short alternating strokes, the piston which is not driving being returned to its starting position during the driving or thrust stroke of the other piston.

In a similar and corresponding manner, the stem 20 may be driven in a downward direction, rather than upward. In such case the pistons 22 and 26 become the driving pistons, while the other two pistons 21 and 25 become the return pistons which in response to the application of low fluid pressure return the driving pistons to their starting positions. The vane-type fluid motors 40 and 41 are reversible and when driving the stem 20 downward, the motors are operated in a direction which is the reverse of that in which they are operated when the stem 20 is being driven upward.

To drive stem 20 downward, briefly described, high fluid pressure is applied alternately to the ports 52 and 56 and at the other alternate times ports 52 and 56 are fully vented through a non-restrictive vent. When high fluid pressure is being applied alternately to ports 52 and 56, the ports 51 and 55 during the same time periods are being connected alternately to the fluid reservoir through restrictive flow-control valve means 60 and 61 (FIG. 4) thereby to establish back pressures the magnitudes of which are dependent upon the load but in all cases are large enough to create a force on the return thrust plates 31, 32 and 35, 36 alternately, of sufficient magnitude to compress the groups of helical compression springs 33, 34 and 37, 38 alternately, thereby to permit the pistons 21, 22 and 25, 26 alternately, to be pressed into tight frictional engagement with nuts 23 and 24. (Where the load is in the same direction as the back pressure, the back pressure is great enough to give good regulation of the flow control valves 60, 61. Where the load is in the opposite direction from the back pressure, the back pressure exceeds, of course, the high pressure of the driving force.)

At the other alternate periods in the cycle, low fluid pressure is connected to ports 51 and 55 to effect return of the drive pistons to their start-of-thrust positions.

Solely for convenience of illustration, the ports 51, 52, 55 and 56 have been shown in FIGS. 1 and 2 in locations which are not the most desirable from a practical point of view, since in the practical construction of the device, the four ports would preferably be located within about a 45° sector of the cylindrical housing 10.

Figures 4, 5:
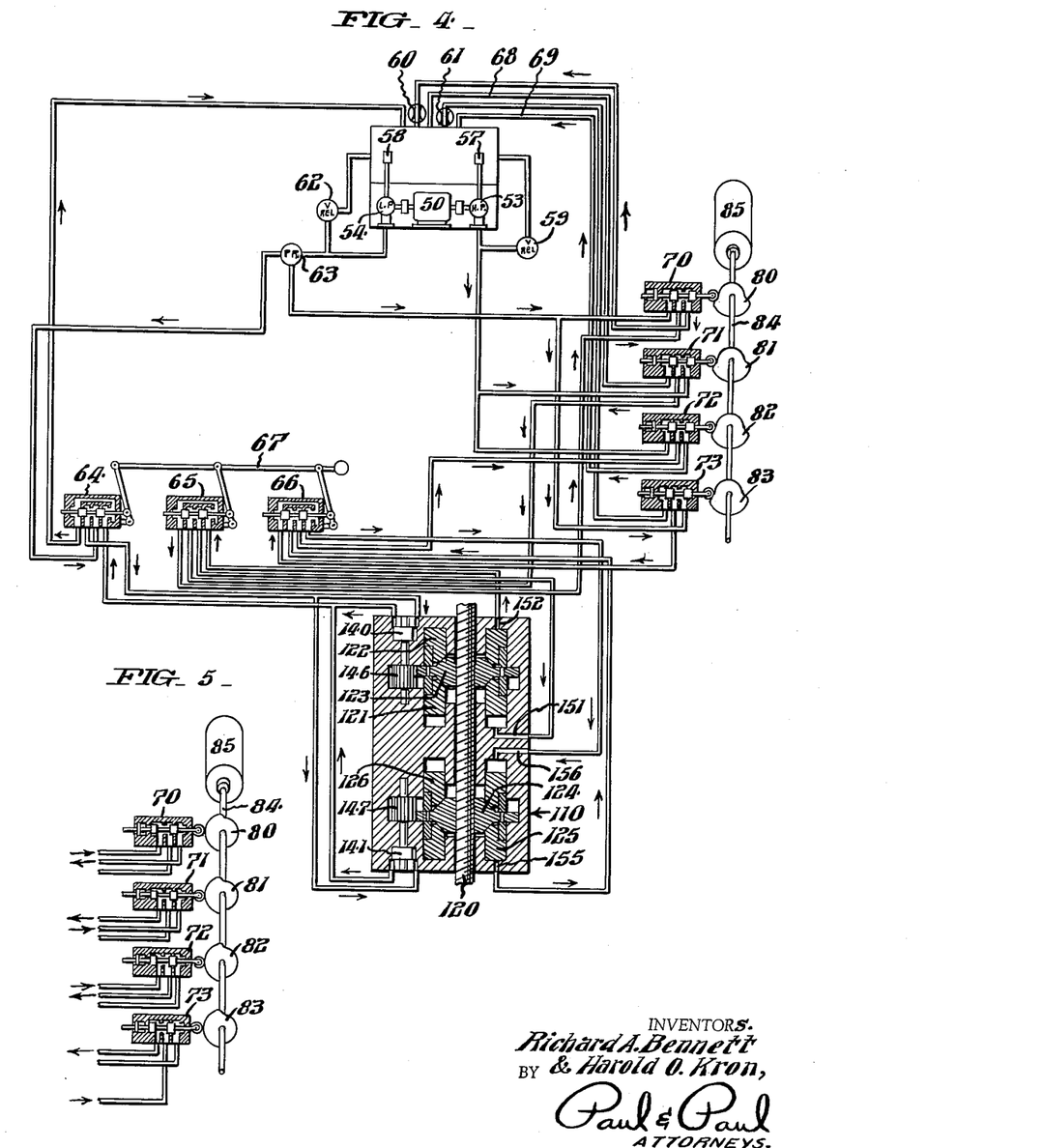
FIG. 4 is a diagrammatic illustration of a cam operated fluid control circuit showing the valves in one position.
FIG. 5 is a diagrammatic illustration of a portion of the fluid control circuit of FIG. 4 showing the valves in another position.

One form of fluid pressure control system which is suitable for use with the hydraulic actuator described hereinabove is shown in FIGS. 4 and 5. There the hydraulic actuator is intended to be essentially the same as that of FIGS. 1–3 described above, but again solely for convenience of illustration the ports are shown at locations in the housing different from those illustrated in FIG. 2 and the vane fluid motors are also shown at different locations. In FIG. 4, the ports vane motors, and other components corresponding to those of FIG. 2 are therefore identified by reference numerals to which 100 has been added. For example, port 151 of the actuator of FIG. 4 corresponds to port 51 of the actuator of FIG. 2, vane motor 141 corresponds to vane motor 41 of FIG. 2, etc.

Referring now to FIG. 4, motor 50 drives a high pressure pump 53 and also a lower pressure pump 54. High pressure pump 53 may be assumed to deliver a pressure of for example 3,000–4,000 p.s.i., while the lower pressure pump 54 delivers a pressure of the order of 500 p.s.i. Reference numerals 57 and 58 identify a high pressure accumulator, and a low pressure accumulator, respectively, while reference numerals 59 and 62 identify relief valves, in the high pressure and low pressure systems, respectively.

Reference numeral 63 identifies a pressure reducing valve which is adapted to pass the full pressure of 500 p.s.i. to the 4-way valve 64 (which controls the direction of rotation of the vane fluid motors 140 and 141) but passes a reduced pressure of only about 50 p.s.i. to the spring-loaded cam-operated 3-way valves 70 and 73 which control the application of said low pressure (50 p.s.i.) to ports 152 and 156 of the upper and lower units, respectively, of the hydraulic actuator 110.

Reference numerals 60 and 61 identify restricting flow-control valves in the return lines adapted to provide a substantially constant flow of fluid at pressures from 500 to 6,000 p.s.i.

The 4-way valves 65 and 66 control the direction in which the stem 120 is to be moved by the hydraulic actuator. As already indicated above, 4-way valve 64 is a vane-motor reversing valve which controls the direction of rotation of the vane fluid motors 140 and 141. All three 4-way valves 64, 65 and 66 are shown to be controlled by a common selection mechanism 67 which ordinarily at least will be manually operated, either directly or through relay means. In FIG. 4, the spools of the three 4-way valves 64, 65 and 66 are in the positions which they occupy when the stem 120 is to be moved upward.

The three-way cam-operated valves 70 and 73 have already been identified as controlling the application of low fluid pressure (50 p.s.i.) alternately to the ports 152 and 156 of the upper and lower units of the actuator. The low-pressure connections to these ports likewise assume that the direction control mechanism 67 is in the position illustrated and that the stem 120 is being moved upward. The other two 3-way cam-operated valves 71 and 72 control the application of high fluid pressure (for example, 3,000 p.s.i.) alternately to ports 155 and 151 of the lower and upper units, respectively, of the actuator.

During alternate periods in the cycle high fluid pressure is blocked at valves 71 and 72, and during these periods these valves complete connections to the unrestricted vented returns 68 and 69, respectively.

Similarly, during alternate periods in the cycle low pressure is blocked at valves 70 and 73, and during these periods these valves complete connections to the restrictive flow-control valves 60 and 61, respectively.

In FIG. 4, the 3-way valves 70, 71, 72 and 73 are illustrated as spring-loaded spool-type valves controlled by cams 80, 81, 82, 83, respectively, mounted on a common shaft 84 driven by suitable motor means 85. In FIG. 4, each of the spools is shown to be in its right-most position. With the spools in this position, the left port of each valve 70–73 is blocked, and the center port is coupled through to the right port.

The solid arrows in FIG. 4 indicate the direction of fluid pressure when the direction-control mechanism 67 is in the position shown (and which determines that the stem 120 is to be moved upward). Insofar as the vane fluid motors 140 and 141 are concerned, the direction of fluid pressure to these motors changes only when the motor direction-control valve 64 is changed. However, insofar as the direction of fluid pressure to the piston ports 151, 152, 155 and 156 is concerned, the direction and magnitude of such pressure changes with each one-half revolution of cam shaft 84. With respect then to the fluid-pressure lines to the ports 151, 152, 155 and 156, the solid arrows shown in FIG. 4 on these lines indicates the direction of pressure during the time period in the cycle when the upper nut 123 of the actuator is being driven upward and the lower nut 124 is being returned to its starting position. During this period, vane motor 141 is driving nut 124, while vane motor 140 is in stalled condition.

Cams 80–83 are so shaped and the speed of rotation of shaft 84 is so selected that just before the piston 121 of the upper unit reaches the limit of its thrust stroke, cam 82 drives the spool of valve 72 to the left, thereby applying high fluid pressure to port 155 and starting piston 125 upward. At the same time, cam 83 drives the spool of valve 73 to the left, thereby disconnecting port 156 from the low pressure line (50 p.s.i.) and connecting it (port 156) to the fluid return line through the restrictive flow-control valve 61.

A very brief interval after the above-described action takes place, cams 80 and 81 drive the spools of valves 70 and 71 to the left, thereby blocking the right-most port of each of these valves and coupling the center port to the left port. The effect, insofar as valve 71 is concerned, is to block off the high fluid pressure, thereby preventing it from reaching port 151, and to connect port 151 to the unrestricted vent line 68. The effect, insofar as valve 70 is concerned, is to de-couple the connection of port 152 to the restrictive flow-control valve 60 and to connect port 152 to the low fluid pressure line (50 p.s.i.).

The conditions of the valves 70 to 74 when the spools are in the left-most positions, as is the case during the period described immediately above, is illustrated in FIG. 5. As there shown, with the spools in the left-most position, the left port is coupled to the center port, and the right port is blocked.

To drive the stem 120 downward, the direction-control mechanism 67 is operated and the spools of the 4-way valves 64, 65 and 66 are moved to their left-most positions. The effect is to couple the left-most port of the valves to the next port to the right, and to couple the right-most port to the next port to the left. This has the effect, insofar as valve 64 is concerned, of reversing the direction of rotation of the vane motors 140 and 141, with the result that these motors now tend to drive the nuts 123 and 124 in the opposite direction, namely, downward. The effect, insofar as valves 65 and 66 are concerned is to so apply the high fluid pressure alternately to ports 152 and 156 as to drive the nuts 123 and 124 alternately downward, thereby to drive stem 120 downward. The alternating connections to the other ports correspond to those hereinbefore described with respect to the upward drive and need not be described here in detail.

The foregoing describes a fluid control system which is time controlled, the timing control being effected, in the particular system illustrated in FIGS. 4 and 5, by means of cams fixed to a cam shaft which is driven rotationally at a selected constant speed.

Figure 6:
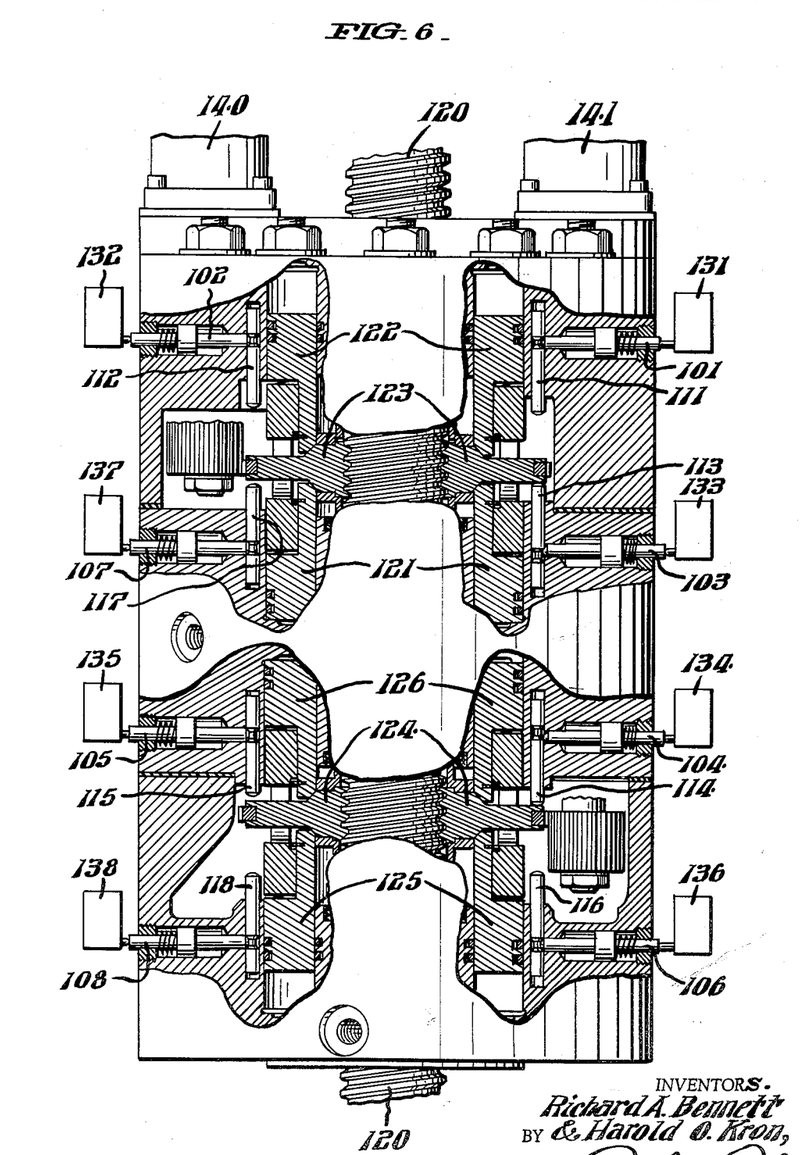
FIG. 6 illustrates an alternate embodiment of a hydraulic actuator generally similar to that of FIG. 2 but in which the fluid flow valves are controlled by piston or nut position-sensing means instead of by timing (cam) means as in FIGS. 4 and 5.
Figure 7:
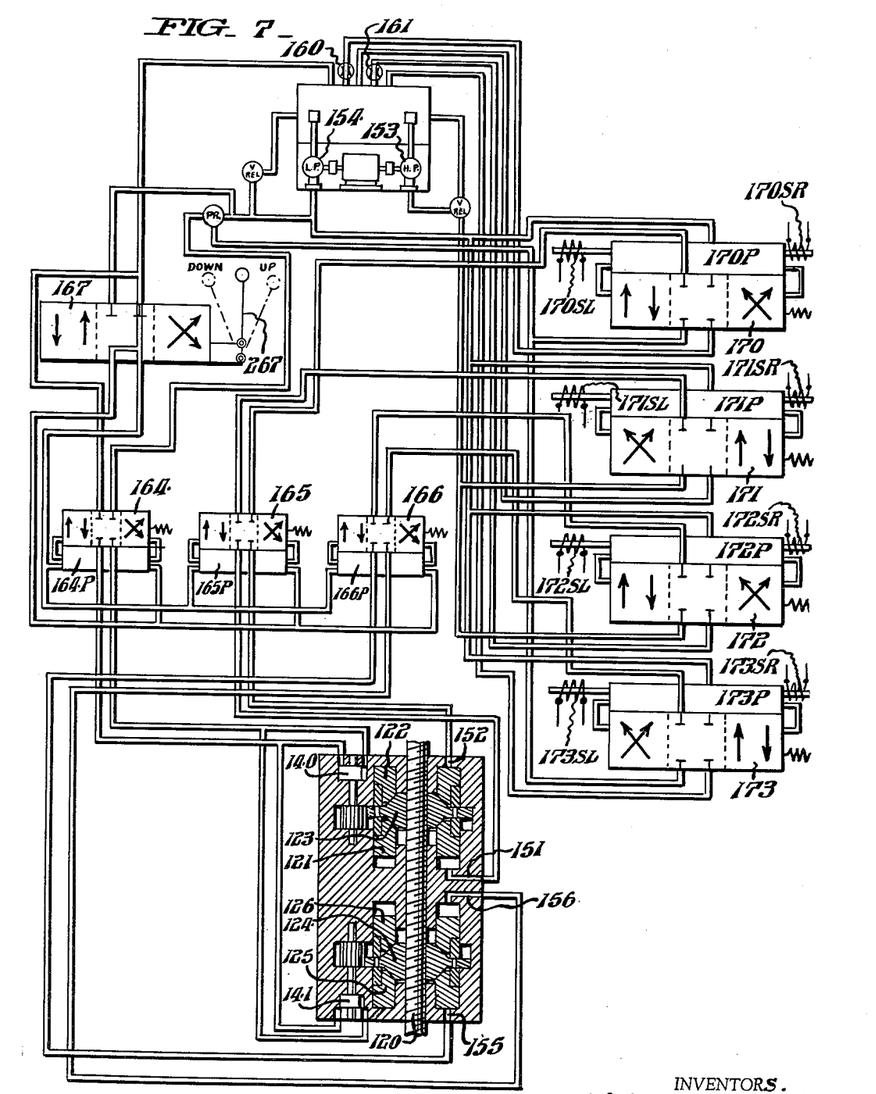
FIG. 7 is a diagrammatic illustration of a fluid control circuit controlled by the position-sensing means of FIG. 6.
Figure 8:
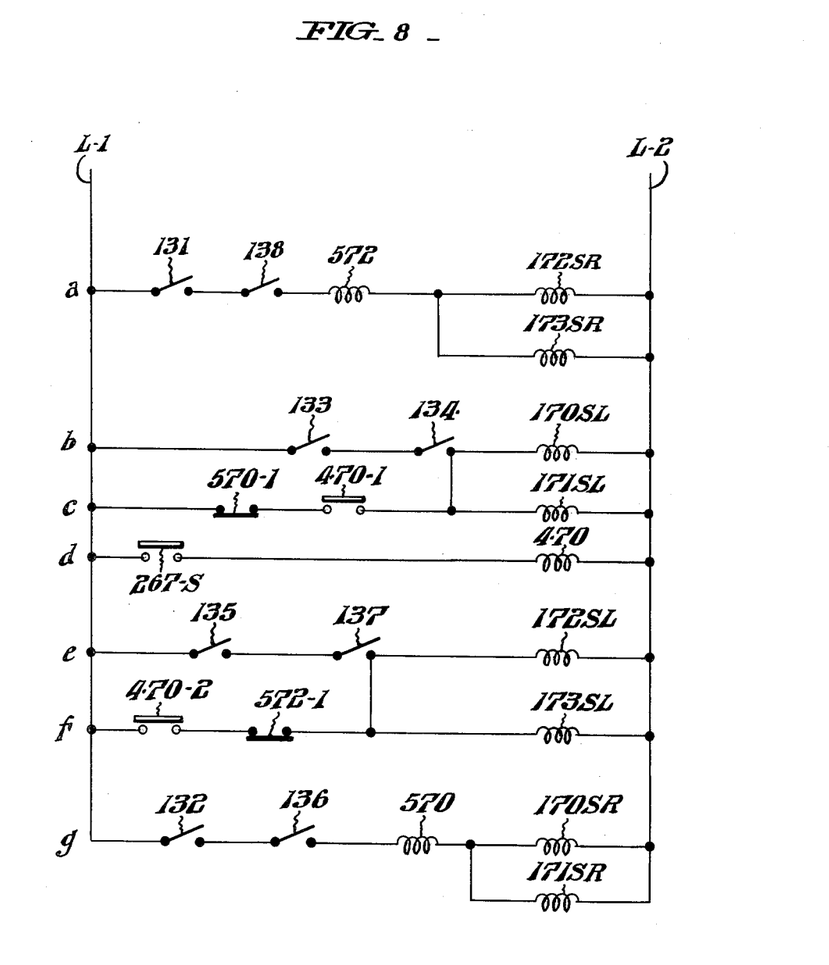
FIG. 8 is a schematic illustration of an electric circuit for controlling the electro-magnetic valves of FIG. 7 in response to the position-sensing means of FIG. 6.

In FIGS. 6, 7 and 8 there is illustrated a fluid pressure control system which is position controlled, i.e., a system which controls the application of fluid pressure to the pistons in response to detection signals generated in response to sensing that the piston or nut has reached certain positions in its thrust stroke and in its return stroke.

Referring now to FIG. 6, there is illustrated one form of means which may be employed to accomplish sensing of the position of the nut. The hydraulic actuator of FIG. 6 is in most respects substantially similar to that illustrated in FIG. 2 described in detail hereinabove. The hydraulic unit of FIG. 6, however, is provided with some additional or auxiliary parts to sense (a) when the nut is within a selected short distance of the limit of its thrust stroke; (b) when the nut has reached substantially the limit of its thrust stroke; (c) when the nut has returned to a selected short distance from its start-of-thrust position; and (d) when the nut has returned substantially all the way to its start-of-thrust position.

Sensing of the above information is illustrated in FIG. 6 as being accomplished by eight horizontally-disposed probes, 101 to 108. These probes are spring-loaded inward, the innermost end of each of the probes being normally inserted into a detent of one of eight vertically-disposed plungers 111 to 118. Each vertically disposed plunger 111-118 is held in normal position by the insertion of an innermost end of one of the horizontal probes 101 to 108 into its detent, and when in such normal position, one end of each of the vertically-disposed plungers projects into the cavity in which the nut 123 or the nut 124 moves. More particularly, the plungers project into the path of the outer peripheral portion of the nut 123 or 124.

The eight plungers 111-118 are grouped in two sets of two pairs each, one set for each nut, one pair of each set projecting downwardly and another pair projecting upwardly into the cavity in the housing in which the nut moves. One plunger of each pair projects farther into the cavity than the other, the plunger which projects the greater distance being used to detect when the nut has reached a selected short distance from the end of its stroke, the shorter plunger being used to detect when the nut has reached substantially the full limit of its stroke.

When one of the plungers 111-118 is moved vertically by one of the nuts 123 or 124, the plunger cams the particular probe 101-108 associated therewith outward, and when this occurs, one of the limit switches 131 to 138 is actuated.

Referring now to FIG. 7 there is illustrated diagrammatically a fluid pressure control system generally similar to that of FIG. 4 but in FIG. 7 the three valves 164–166 are low-pressure fluid-operated pilot-operated valves. For convenience, these valves are merely depicted diagrammatically in FIG. 7 but these types of valves are well-known and the manner in which they function will be readily understood.

In brief, valves 164–166 are spring-biased to center or neutral position and each is adapted to be moved in either direction by hydraulic pressure directed against one end or the other of the main spool thereof according to the position of the particular pilot valve 164P–166P associated therewith, the position of the pilot valve being dependent upon the direction of the low pressure fluid applied thereto as controlled by valve 167 and selection lever 267.

Valves 170–174 are likewise spring biased to center or neutral position and each valve is adapted to be moved in either direction by hydraulic pressure directed against one end or the other of the main spool thereof according to the position of the particular pilot valve 170P–173P associated therewith, the position of the pilot valve being dependent upon the energization of one or the other of the two solenoids (170SL–173SL or 170SR–173SR) associated with each pilot valve. It will be understood that when the pilot spool has been pulled into one position by the particular controlling solenoid, the pilot spool remains in that position even though the current through that solenoid terminates.

The circuit positions of the solenoids 170SL–173SL and 170SR–173SR are shown in the schematic electrical circuit diagram of FIG. 8. Also shown in FIG. 8 are the circuit positions of the limit switches 131–138 and of various relays.

The operation of the position-sensitive flow control system of FIGS. 6, 7 and 8 will now be described. To move the stem 120 upward, the selection lever 267 is placed manually in the UP position. This selection lever determines the position of the spool of selection valve 167 which in turn determines the direction of low fluid pressure from the low pressure pump 154 to the pilot valves 164P, 165P and 166P. These pilot valves determine the positions of direction-control valves 164, 165 and 166 which correspond in function to the direction-control valves 64, 65 and 66, respectively of FIG. 4. Specifically valve 164 is the fluid-motor reversing valve which controls the direction of rotation of the vane fluid motors 140 and 141, while valves 165 and 166 control the flow of fluid pressure to the ports 151, 152, 155 and 156 of the actuator according to the direction in which the stem 120 is to be moved, as selected by lever 267.

In the illustration of FIG. 7, when selection lever 267 is placed in the UP position, the direction of low pressure fluid is assumed to be such as to move each of pilot valves 164P, 165P, and 166P to such position as to push the spools of valves 164, 165 and 166 to their rightmost positions against the action of the bias spring.

Referring now to the electrical circuit diagram of FIG. 8, when the selection lever 267 is placed in the UP position, a switch 267–S (branch "d") is automatically closed which completes a circuit through relay 470. Contacts 470–1 close and this closes a circuit to the parallel-connected windings of solenoids 170SL and 171SL of valves 170 and 171 (FIGS. 7 and 8).

When this occurs, the spools of valves 170 and 171 (FIG. 7) are pulled to their left-most positions and fluid high pressure is then directed from high-pressure pump 153 through valves 171 and 165 to the cylinder of upper-unit piston 121 causing piston 121 to move upward, carrying upper-nut 123 and stem 120 with it. When this occurs, the cylinder of piston 122 exhausts through valves 165 and 170 and through the restrictive flow-control valve 160. Low pressure fluid is connected through valves 173 and 166 to the cylinder of lower-unit piston 126, and the cylinder of piston 125 is connected through valves 166 and 172 to unrestricted exhaust. As a result, lower-unit nut 124 returns down to its start-of-thrust position, depressing plungers 116 and 118 and closing the limit switches 136 and 138.

When upper-unit nut 123 has moved up most but not all of the full stroke, for example, 1⅜″ of a full stroke of 1½″, the nut 123 strikes plunger 111 and moves it upward, thereby moving probe 101 outward and closing limit switch 131. Limit switch 131 is connected electrically in series with limit switch 138 (branch "a" of FIG. 8) and hence the closing of limit switch 131 has no effect unless limit switch 138 is also closed. As just described above, limit switch 138 is closed by the lower-unit nut 124 at the completion of its return stroke, at which time it strikes plunger 118 located at its start-of-thrust position. The return of lower-unit nut 124 to this point will ordinarily occur slightly before, or concurrently with, the arrival of the upper-unit nut 123 at the point located at a selected short distance below the full limit of its thrust stroke, in the present example, ⅛″ short of the full 1½″ stroke.

Assuming then that limit switch 138 is closed by the returning nut 124 by the time the driving nut 123 reaches plunger 111, the windings of solenoids 172SR and 173SR will be energized when switch 131 is closed (branch "a" of FIG. 8). Included in series in branch "a" is a relay 572 which is also energized at this time. The normally-closed contacts 572–1 of this relay are thereby opened (branch "f"), thereby de-energizing the solenoids 172SL and 173SL.

As a result of the action just described, the spools of valves 172 and 173 are moved to their right-most position. When this occurs, fluid high pressure is applied through valves 172 and 166 to the cylinder of the lower-unit piston 125, thus causing piston 125 and nut 124 to move upward. At this time, the cylinder of piston 126 exhausts through valve 173 and through restrictive flow-control valve 161.

At about this time, the upper-unit piston 121 and nut 123 reach substantially the extreme limit of the thrust stroke, and the nut 123 strikes plunger 112. This closes limit switch 132 (branch "g") and, since limit switch 136 is already closed, as described above, the windings of solenoids 170SR and 171SR and also of relay 570 are energized. The normally-closed relay contacts 570–1 (branch "c") open, and the solenoids 170SL and 171 SL are de-energized.

The effect of energizing solenoids 170SR and 171SR, and of de-energizing solenoids 170SL and 171SL is to move the spools of valves 170 and 171 to their right-most positions. This directs low pressure fluid through valves 170 and 165 to the cylinder of piston 122, and opens the cylinder of piston 121 through valves 165 and 171 to exhaust, and has the effect of returning upper-unit piston 122 and nut 123 down toward its start-of-thrust position. Plungers 111 and 112 are returned to their normal positions by the probes 101 and 102, and limit switches 131 and 132 open. Solenoids 170SR, 171SR, 172SR and 173SR are de-energized but this has no effect on the pilot valves 170P, 171P, 172P, and 173P, which remain in their same positions.

In reaching its full return to its start-of-thrust position, nut 123 strikes successively plungers 113 and 117 which, through the medium of probes 103 and 107, close limit switches 133 and 137 (FIGS. 6 and 8). This has no effect unless switch 134 or 135 is also closed.

When lower-unit piston 125 and nut 124 have moved up to a point, assumed in the present discussion to be located ⅛″ from the end of its full 1½″ stroke, the nut 124 contacts the plunger 114 which closes limit switch 134. Limit switch 134 is connected electrically in series with limit switch 133, but limit switch 133 is now closed, as just described. Hence, the windings of solenoids 170SL and 171SL are again energized. Solenoids 170SR and 171SR are no longer energized since limit switches 132 and 138 are both open, switch 132 having opened when upper-unit 123 started its return stroke down, and switch 138 having opened when lower-unit nut 124 started its thrust stroke up. Thus, when solenoids 170SR and 171SR are energized, as described above, the spools of valves 170 and 171 again move to their left-most positions. This again directs high pressure fluid to the cylinder of piston 121 to start piston 121 up again for the second time.

When the piston 125 and nut 124 have reached the full thrust stroke, 1½″ in the present example, the nut 124 contacts the plunger 115 which moves probe 105 outward to close the limit switch 135 which is in series with the limit switch 137. Limit switch 137 will ordinarily now be closed since it is closed when nut 123 completes its return down to its start-of-thrust position. Thus, when switch 135 is closed, the solenoids 172SL and 173SL are energized (FIGS. 7 and 8) and since solenoids 172SR and 173SR are now in de-energized condition by reason of switch 131 being open, the spools of valves 172 and 173 are pulled to their left-most positions. This has the effect of directing low pressure fluid through valve 173 to the cylinder of piston 126 and of connecting the cylinder of piston 125 through valve 172 to vent, allowing the cylinder to empty. This moves the piston 126 and the nut 124 downward toward its start-of-thrust position.

When the piston 125 and the nut 124 have returned to their start-of-thrust position, the nut 124 contacts in succession the plungers 116 and 118, closing limit switches 136 and 138.

The operation above described then repeats itself until the desired amount of movement of the stem 120 has been accomplished, at which time the selection lever 267 is thrown manually to its neutral position to stop the action.

To move the stem 120 down, instead of up, the selection lever 267 is placed in the DOWN position. This reverses the direction of flow of pressure to the pilot valves 164P–166P and pulls the valves 164–166 to their leftmost position. This, in turn, reverses the connections to the cylinders of the pistons 121, 122, 125 and 126 and to the vane fluid motors 140, 141. The action in driving the stem 120 down is otherwise similar to that described above with respect to the upward movement of stem 120.

The limit-switch controlled solenoid-operated pilot-operated valve system just described is effective to complete all operations. If a step which should follow another becomes completed too soon, the actuator unit will stop and wait for the completion of the step which should precede. The actuator will not go out of sequence.

It is to be understood that the particular position-sensitive system shown in FIGS. 6, 7 and 8 is but one practical system for controlling the fluid actuator of the present invention on the basis of detecting the positions of the two nuts. Other suitable detection systems may be devised without departing from the invention as claimed in the appended claims. Likewise, other time-controlled systems than the particular cam-operated system illustrated in FIGS. 4 and 5 may be devised without avoiding the invention claimed in the appended claims.

The hydraulic actuator described herein is adapted to develop a thrust of very substantial magnitude. For example, if the fluid high pressure be 3,500 p.s.i., and the back pressure developed by the restrictive flow-control valve be 500 p.s.i., the net forward pressure is 3,000 p.s.i., and if the base area of each annular piston be 35 square inches, the thrust force is approximately 105,000 lbs.

Assuming a full piston stroke of 1½", with each piston being actuated ⅛" before termination of the thrust stroke of the other, a net stroke of 2¾" per cycle is obtained. It will be seen then that by operating at a frequency of 50 cycles per minute, the stem can be moved 137.5" per minute.

The back pressure developed by the restrictive flow-control valve in the return system provides protection against excessive shock to the stem in the event of sudden loss of load. Protection against shock to the stem due to drop-back in the event of sudden loss of fluid high pressure is derived from the fact that the nuts of the upper and lower units are operating alternately. The maximum drop of the stem, in the event of loss of high pressure while driving up, is one-half the stroke length. Thus, by designing the unit to have a shorter stroke, increased protection can be obtained against shock due to loss of driving pressure. Of course, check valves may also be designed into the system, if deemed necessary.

While the preferred embodiments of this invention have been described in some detail, it will be obvious to one skilled in the art that various modifications may be made without departing from the invention as hereinafter claimed.

For example, while we prefer to employ high pressure for piston thrust and low pressure for the piston return, the same high pressure could, if desired, be used for both purposes with, if desired, the return high pressure being applied to a smaller area of the piston in order to apply a lesser force.

Having described our invention, we claim:

1. A hydraulic actuator for a threaded shaft; said actuator comprising, first and second nuts adapted to be threaded on said shaft at spaced-apart positions; first and second pistons, one associated with each of said nuts; first fluid-pressure means for thrusting said first and second pistons alternately and successively against their respective nuts in a common axial direction with respect to said shaft, thereby to move said shaft axially in said direction; second fluid-pressure means for returning one of said pistons to its start-of-thrust position during at least a portion of the thrust stroke of the other piston; and fluid-motor drive means for driving the nut associated with said returning piston rotationally on said shaft in a direction to move said nut in the same axial direction as that in which said returning nut is being driven, thereby to return said nut to a position adjacent to the returned piston at least by the time of the start of the succeeding thrust stroke of said returned piston.

2. A hydraulic actutaor for a threaded shaft, said actuator comprising: first and second nuts adapted to be threaded on said shaft at spaced-apart positions; first and second pistons, one associated with each of said nuts; fluid high-pressure means for thrusting said first and second pistons alternately and successively against their respective nuts in a common axial direction with respect to said shaft, thereby to move said shaft axially in said direction; fluid low-pressure means for returning one of said pistons to its start-of-thrust position during at least a portion of the thrust stroke of the other piston; and fluid-motor drive means for driving the nut associated with said returning piston rotationally on said shaft in a direction to move said nut in the same axial direction as that in which said returning nut is being driven, thereby to return said nut to a position adjacent to the returned piston at least by the time of the start of the succeeding stroke of said returned piston.

3. A hydraulic actuator for a threaded shaft, said actuator comprising: first and second nuts adapted to be threaded on said shaft at spaced-apart positions; first and second annular pistons, one associated with each of said nuts, each piston having a thrust flange extending in the direction of the nut associated therewith; fluid high-pressure means for thrusting the flanges of said first and second pistons alternately and successively against their respective nuts in a common axial direction with respect to said shaft, thereby to move said shaft axially in said direction; fluid low-pressure means for returning one of said pistons to its start-of-thrust position during at least a portion of the thrust stroke of the other piston; and fluid-motor drive means for driving the nut associated with said returning piston rotationally on said shaft in a direction to move said nut in the same axial direction as that in which said returning nut is being driven, thereby to return said nut to a position adjacent to the returned piston at least by the time of the start of the succeeding thrust stroke of said returned piston.

4. A hydraulic actuator as claimed in claim 3 characterized in that separate fluid-motor drive means are coupled to each nut, and in that the fluid-motors of said fluid-motor drive means are adapted to be stalled during the thrust stroke of the particular piston and nut associated therewith, the nut being prevented from rotating during the thrust stroke by the frictional engagement of said piston thrust flange.

5. A hydraulic actuator as claimed in claim 4 characterized in the provision of fluid-pressure directing means for both said high-pressure and said low-pressure systems, said directing means being adapted to direct said high fluid pressure alternately to the same corresponding one side of each of said pistons to thrust each of said pistons and associated nuts alternately in the same direction, said directing means being adapted to direct said low fluid pressure alternately to the same corresponding other side of each of said pistons to return said piston to which said low pressure is directed to its start-of-thrust position during the thrust stroke of the other piston.

6. A hydraulic actuator as claimed in claim 5 further characterized in that said high fluid pressure means includes restrictive flow-control means, and in that said fluid-pressure directing means for said high-pressure means includes means for returning fluid from the opposing side of each piston during its thrust stroke through said restrictive flow-control means, thereby to set up a back pressure opposing said high pressure thrust.

7. A hydraulic actuator as claimed in claim 3 characterized in the provision of fluid-pressure directing means for both said high-pressure and said low-pressure systems, said directing means being adapted to direct said high fluid pressure alternately to the same corresponding one side of each of said pistons to thrust each of said pistons and associated nuts alternately in the same direction, said directing means being adapted to direct said low fluid pressure alternately to the same corresponding other side of each of said pistons to return said piston to which said low pressure is directed to its start-of-thrust position during the thrust stroke of the other piston.

8. A hydraulic actuator as claimed in claim 7 further characterized in that said high fluid pressure means includes restrictive flow-control means, and in that said fluid-pressure directing means for said high-pressure means includes means for returning fluid from the opposing side of each piston during its thrust stroke through said restrictive flow-control means, thereby to set up a back pressure opposing said high pressure thrust.

9. A hydraulic actuator as claimed in claim 8 characterized in that each of said nuts is provided with radial bearing means; in that each of said annular pistons is provided with an annular compressible thrust plate normally held in an extended position by a compression spring; in that said compressible plate is positioned for contact with said bearing means; in that said compression spring is adapted to be compressed by the force of said high pressure thrust thereby to allow retraction of said extended thrust plate and to permit said piston thrust flange to make frictional contact with said nut; and in that said compression spring is adapted to prevent compression of said spring by the force of said low pressure, thereby to maintain said thrust plate in extended position and said piston thrust flange free of contact of said nut during the low-pressure return stroke, thereby to allow contact only between said plate and said bearing during said return stroke, thereby to permit rotation of said nut by said fluid motor during the return stroke of said piston but to prevent rotation of said nut by said fluid motor during said thrust stroke.

10. A hydraulic actuator as claimed in claim 7 characterized in that each of said nuts is provided with radial bearing means; in that each of said annular pistons is provided with an annular compressible thrust plate normally held in an extended position by a compression spring; in that said compressible plate is positioned for contact with said bearing means; in that said compression spring is adapted to be compressed by the force of said high pressure thrust thereby to allow retraction of said extended thrust plate to permit said piston thrust flange to make frictional contact with said nut; and in that said compression spring is adapted to prevent compression of said spring by the force of said low pressure, thereby to maintain said thrust plate in extended position and said piston thrust flange free of contact of said nut during the low-pressure return stroke, thereby to allow contact only between said plate and said bearing during said return stroke, thereby to permit rotation of said nut by said fluid motor during the return stroke of said piston but to prevent rotation of said nut by said fluid motor during said thrust stroke.

11. A hydraulic actuator for moving a threaded shaft in either of its two opposite lengthwise directions, said actuator comprising: first and second nuts adapted to be threaded on said shaft at spaced-apart locations; first and second pairs of opposing annular pistons, one pair associated with each of said nuts, one piston of each pair being located on opposite sides of the nut associated therewith; a fluid pressure system including a source of fluid high pressure, a source of fluid low-pressure and fluid-directing means for directing said fluid high pressure alternately to a selected one piston of each pair, said one piston being located on the same corresponding side of the nut associated therewith, for thrusting said one piston of each pair alternately and successively against its respective nut in a common axial direction with respect to said shaft thereby to move said shaft axially in said direction, said fluid-directing means including means for directing said fluid low pressure alternately to the opposing ends of said other piston of each pair for returning the opposing piston to its start-of-thrust position; reversible fluid-motor means coupled to each nut for rotating said nut in a direction to return said nut with said returning piston; and manually controlled selection means for selecting the direction of rotation of said reversible fluid-motor means and for selecting the piston of each pair to which said fluid high pressure is alternately directed.

12. A hydraulic actuator as claimed in claim 11 characterized in that said fluid high pressure means includes return circuit means having connected therein restrictive flow-control means for setting up a fluid back pressure in opposition to said fluid high pressure during the thrust stroke of each piston.

13. A hydraulic actuator as claimed in claim 12 further characterized in that said fluid-directing means for directing said fluid high pressure alternately to a selected one piston of each pair includes timing means.

14. A hydraulic actuator as claimed in claim 13 characterized in that said timing means are camming means.

15. A hydraulic actuator as claimed in claim 12 further characterized in that said fluid-directing means for directing said fluid high pressure alternately to a selected one piston of each pair includes sensing means for sensing the positions of the thrust-stroke nut and of the returning nut.

16. A hydraulic actuator as claimed in claim 15 further characterized by the provision of electric circuit means responsive to said position-sensing means, and by the provision of solenoid-operated valve means responsive to said electric circuit means.

17. A hydraulic actuator for a threaded shaft; said actuator comprising, first and second nuts adapted to be threaded on said shaft at spaced-apart positions; fluid-pressure means for thrusting said first and second nuts alternately and successively in a common axial direction with respect to said shaft to move said shaft axially in said direction; and fluid means for returning one of said nuts rotationally to its start-of-thrust position during the thrust stroke of the other nut.

18. A hydraulic actuator for a threaded shaft, said actuator comprising; first and second nuts adapted to be threaded on said shaft at spaced-apart positions; first and second pistons, one associated with each of said nuts, fluid pressure means for thrusting said first and second pistons alternately and successively against their respective nuts in a common axial direction with respect to said shaft, thereby to move said shaft axially in said direction; fluid pressure means for returning one of said pistons to its start-of-thrust position during the thrust stroke of the other piston; and fluid means for driving the nut associated with said returning piston rotationally on said shaft in a direction to move said nut in the same axial direction as that in which said returning nut is being driven.

19. A hydraulic actuator for a threaded shaft, said actuator comprising; first and second nuts adapted to be threaded on said shaft at spaced-apart positions; first and second annular pistons, one associated with each of said nuts, each piston having a thrust flange extending in the direction of the nut associated therewith; fluid pressure means for thrusting the flanges of said first and second pistons alterntaely and successively against their respective nuts in a common axial direction with respect to said shaft to move said shaft axially in said direction; fluid pressure means for returning one of said pistons to its start-of-thrust position during the thrust stroke of the other piston; and fluid means for driving the nut associated with said returning piston rotationally on said shaft in a direction to move said nut in the same axial direction as that in which said returning nut is being driven.

No references cited.